United States Patent
Snyder et al.

(10) Patent No.: US 6,320,579 B1
(45) Date of Patent: Nov. 20, 2001

(54) COCKPIT DISPLAY HAVING 3D FLIGHT PATH ERROR SYMBOLOGY

(75) Inventors: Mark I. Snyder; Dean R. Wilkens, both of Glendale, AZ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/223,591

(22) Filed: Dec. 30, 1998

(51) Int. Cl.[7] .................................................. G06T 15/00
(52) U.S. Cl. .............................................. 345/419; 701/14
(58) Field of Search .................. 345/419; 340/974–977; 707/14–16, 18

(56) References Cited

U.S. PATENT DOCUMENTS

| | | | |
|---|---|---|---|
| 4,967,363 | * 10/1990 | Bonafe | 364/427 |
| 5,745,863 | * 4/1998 | Uhlenhop et al. | 701/14 |
| 5,798,713 | * 8/1998 | Viebahn et al. | 340/974 |

* cited by examiner

*Primary Examiner*—Mark Zimmerman
*Assistant Examiner*—Lance W. Sealey

(57) ABSTRACT

A primary flight display (PFD) for an aircraft generating a 3-dimensional (3D) symbology indicative of the aircraft situational information. The 3D symbology includes a 3D vertical path error symbol and a 3D lateral flight path error symbol. Several 3D altitude symbols are also displayed which collectively render a 3D representation of the aircraft situation. The 3D symbology enhances the pilot's awareness of the aircraft situation to accurately control the aircraft, and to easily to monitor the performance during manual and automatic flight.

20 Claims, 7 Drawing Sheets

US 6,320,579 B1

COCKPIT DISPLAY HAVING 3D FLIGHT PATH ERROR SYMBOLOGY

FIELD OF THE INVENTION

The present invention is generally related to aircraft displays including a primary flight display (PFD) utilized in the cockpit of an aircraft, and more particularly to a primary flight display rendering visual symbology indicative of aircraft position relative to vertical reference plains. The reference plain can be horizontal, to represent a fixed altitude or a set of altitude references or at a fixed angle above or below horizontal to represent a climbing or descending plane.

BACKGROUND OF THE INVENTION

Commercial and military aircraft are provided with a variety of cockpit instrumentation. This instrumentation includes navigation equipment, radios, gauges, flight computers and CRT displays suited to control the aircraft and provide situational awareness of the aircraft to the pilot during flight. One type of display data is vertical aircraft position relative to barometric altitude or a vertical flight path relative to a ground reference point (runway threshold) or predefined waypoint. Conventional flight displays typically provide pilots with representations of old technology mechanical indicators such as pointers on a dial or scale or a moving tape display. There is a desire to improve aircraft situational awareness through the use of intuitive altitude and vertical path error displays. The improved situational awareness is important for both manual control flight, and also for autopilot coupled flight. By providing the pilot improved situational awareness, the ability to monitor the flight controls and respond to a problem is much better, and consequently, the operational safety of the aircraft can be improved.

SUMMARY OF THE INVENTION

The present invention achieves technical advantages as an aviation primary flight display displaying 3-dimensional (3D) symbology indicative of the aircraft situation, including altitude and vertical path error displays. The symbology includes both a 3D vertical path error symbol, and a 3D altitude ladder. These symbols allow the pilot to intuitively and quickly ascertain the aircraft's situation with respect to a glideslope and target altitude. The vertical path error display is referenced to a ground reference navigation source, such as a glideslope beacon located at the approach end of a runway, while the 3D altimeter is referenced to an altitude source and target data. The 3D path error symbology indicates if the aircraft is above or below the glideslope. The 3D vertical path error symbology improves situational awareness by allowing the pilot to directly observe the flight path angle and make adjustments accordingly.

The present invention comprises an aviation display for an aircraft including a device for receiving at least one input signal indicative of the aircraft situation and responsively providing situation signals. The display further comprises a display device receiving the situation signals and generating a 3D visual display including 3D symbology indicative of the aircraft situation. The 3D symbology includes a 3D path error symbol which is referenced to a ground reference navigation source symbology and is indicative of a vertical path error of the aircraft. The 3D vertical path error symbology preferably includes at least one triangular wedge-shape symbol tapering towards the ground path navigation source. Preferably, the 3D vertical path error symbology includes a pair of opposing triangular symbols each tapering towards the ground reference navigation source. The pair of opposing triangular symbols are interconnected by symbology indicative of a roll of the aircraft. In addition, the pair of opposing triangular symbols are interconnected by symbology that is indicative of aircraft pitch.

The visual display further generates symbology indicative of an attitude of the aircraft, wherein this attitude symbology preferably comprises an attitude sphere. The 3D visual display further includes 3D altitude symbology indicative of the aircraft altitude relative to a desired altitude. This 3D altitude symbology comprises triangular symbols tapering towards points at the given altitude at an infinite distance in front of the aircraft.

The aviation display merges the attitude sphere, the horizontal situation display, the vertical deviation display, and a lateral deviation display into a 3D image and includes superimposed flight path vector symbols onto this image. The 3D symbology provides a significant improvement in situational awareness of the aircraft position relative to ground reference navigation sources, and provides an indication of the instantaneous flight path and flight path velocity. This 3D display enhances situational awareness allowing pilots to control the aircraft more accurately, and to more easily monitor the performance of the automatic flight control system. The display combines the 3D lateral and vertical deviation displays with attitude, altitude, and heading to provide a single integrated view of the flight path situation.

DESCRIPTION OF THE PREFERRED EMBODIMENT

Figure 1:
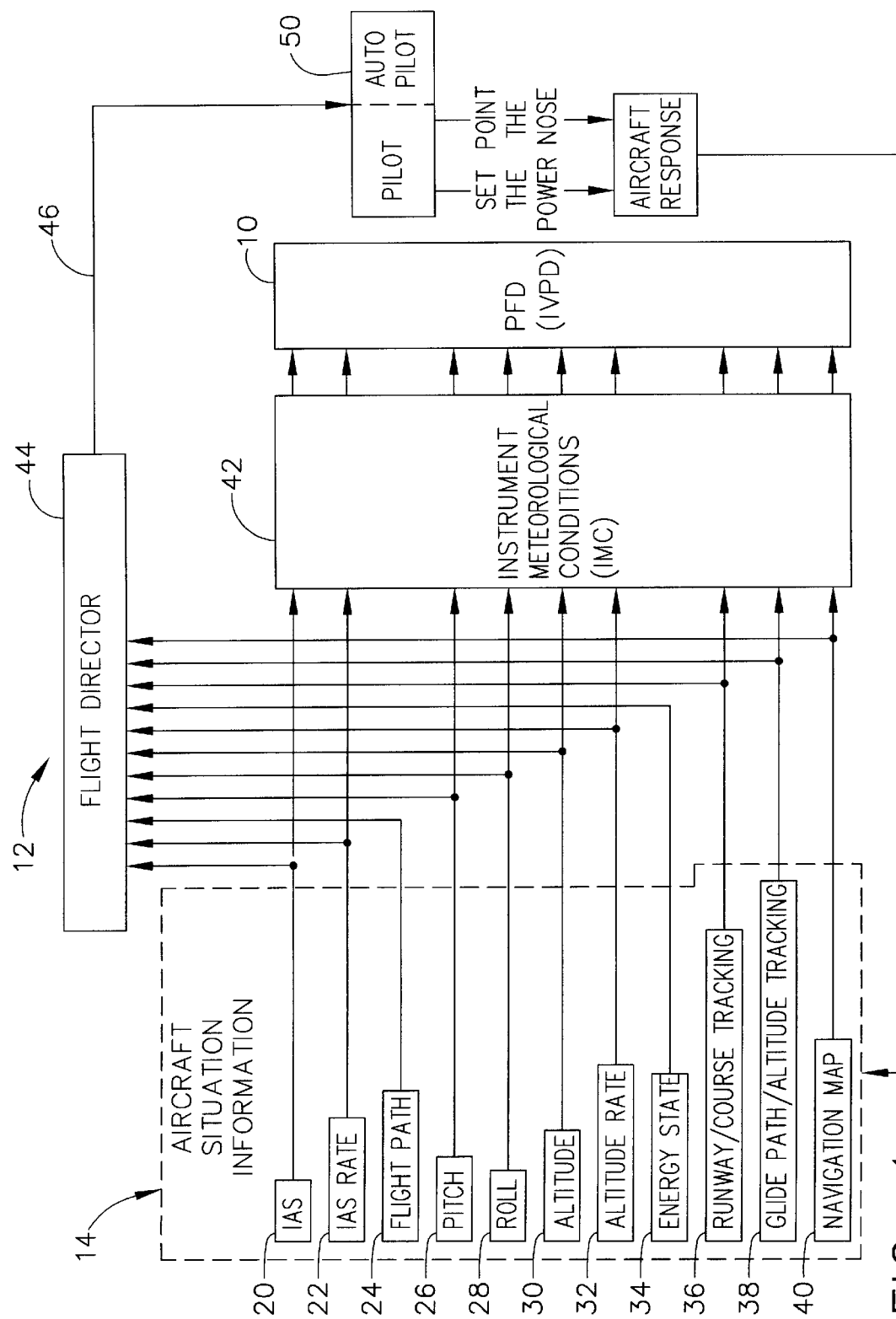
FIG. 1 is a block diagram of an aircraft sensor suite providing situational information to the primary flight display according to the present invention rendering a 3D flight path vector symbol.

Referring now to FIG. 1, there is generally shown at 10 a functional block diagram of a primary flight display 10 according to the present invention functionally coupled to and interfaced with various aircraft electronics shown generally at 12. A sensor suite 14 including a plurality of aircraft situation information devices is seen to provide aircraft situation information to the primary flight display 10. As will be described and illustrated shortly in view of the Figures, the primary flight display 10 receives the various aircraft situation information from sensor suite 14, processes this information, and visually displays the various information including 3D flight path error symbols. This display has improved positional information to provide improved situational awareness to the pilot. The 3D symbology allows the pilot to intuitively obtain the situational awareness of the aircraft, thereby improving the ability of the pilot to monitor the flight controls, to control the aircraft, and to respond to a problem much better, thereby improving the operational safety of the aircraft.

First with reference to the aircraft situation information devices comprising sensor suite 14, the various devices provide a multitude of aircraft information. These devices include IAS 20, IAS rate 22, flight path 24, pitch 26, roll 28, altitude 30, altitude rate 32, energy state 34, runway/course tracking 36, glide path/altitude tracking 38, and navigation map 40. The particular devices 14 providing this aircraft situation information are available through commercially available sources. The sensor suite 14 provides the various associated aircraft situational information to pertinent computational devices which ultimately provide the indicated information to the primary flight display 10. As shown in FIG. 1, an instrument metreological conditions (IMC) device 42 may interface the aircraft situation information generated by sensor suite 14 to the primary flight display 10. A flight director 44 is also seen to receive all of the aircraft situation information from sensor suite 14 to help calculate a preferred flight path and aircraft control, and providing a plurality of output signals on line 46, including a pitch and roll command, to the pilot/auto pilot shown at 50. The pilot/autopilot 50 then responsively can set the power and point the nose of the aircraft to respond the aircraft accordingly. The aircraft response is ultimately detected by the sensor suite 14 to provide a feedback loop.

According to the present invention, the screen of primary flight display 10 is visually observable by the pilot, and provides visual positional and situational awareness to the pilot when the pilot is manually controlling the aircraft, and when the pilot is observing the operational characteristics of the autopilot. The primary flight display 10 provides an integrated velocity and position display (IVPD) suitable for large format displays. The display 10 significantly improves representation of existing and new information on the pilot primary flight display.

The display 10 merges symbology including the attitude sphere, the horizontal situation display, the lateral deviation display, and the vertical deviation display into 3D images, and superimposes the 3D flight path error symbology onto this image. This 3D symbology provides a significant improvement in situational awareness of the aircraft position relative to ground reference navigation sources, and provides an indication of the instantaneous flight path and flight path velocity.

The improved display 10 achieves technical advantages by combining traditional cockpit performance indications, such as air speed, altitude, vertical speed, etc., with traditional control indications, including attitude and power into new 3D integrated symbology elements that the pilot directly controls including the flight path vector group. The present invention further achieves technical advantages by transforming the attitude sphere and heading display into a single 3D display.

Figure 2:
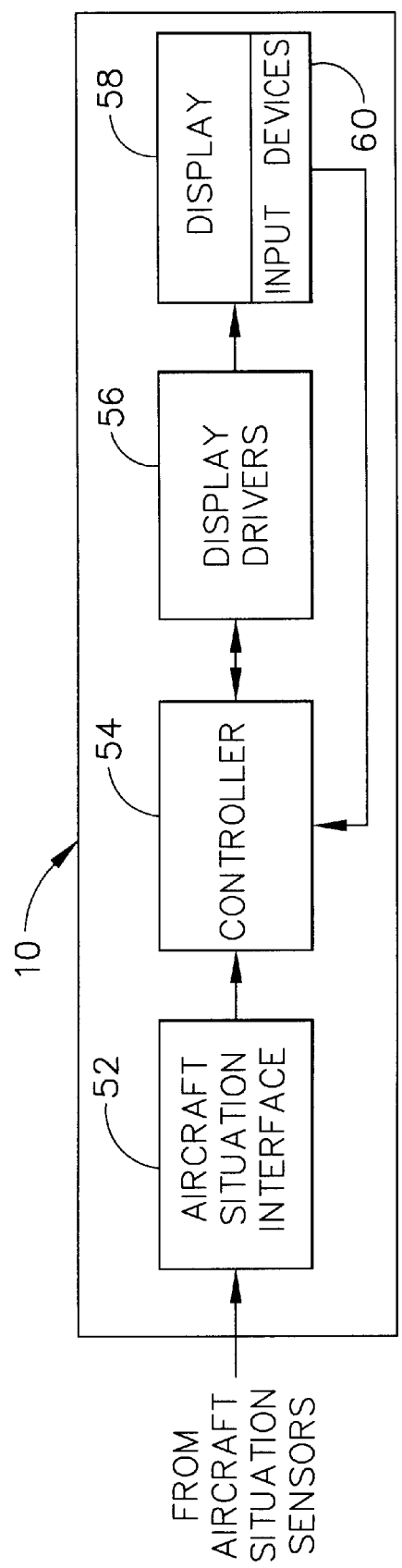
FIG. 2 is a block diagram of the primary flight display according to the present invention.

First, with reference to FIG. 2, there is shown a block diagram of the primary flight display 10 according to the present invention. PFD 10 is seen to include an aircraft situation interface 52 receiving a plurality of inputs from the various aircraft situation sensors, collectively shown as sensor suite 14 in FIG. 1. This interface 52 couples this aircraft situation information to a microprocessor based controller 54. Controller 54 processes this various situational information and has various software programs to process the various information as a whole for ultimate display. PFD 10 is provided with a plurality of display drivers 56 receiving display information from controller 54, and ultimately driving a display screen 58 to visually represent this information in a 3D format. Display screen 58 may include a CRT, LCD or other suitable display for visually displaying the situational information. Input devices 60 coupled to controller 54, such as associated keypads or touchpad devices proximate display screens 58 allow modification of the display 58. For instance, the pilot may utilize various input buttons 60 to modify the visual display in size, to choose various screens for display, to add and remove various information from the screen being displayed and so forth.

Figure 3:
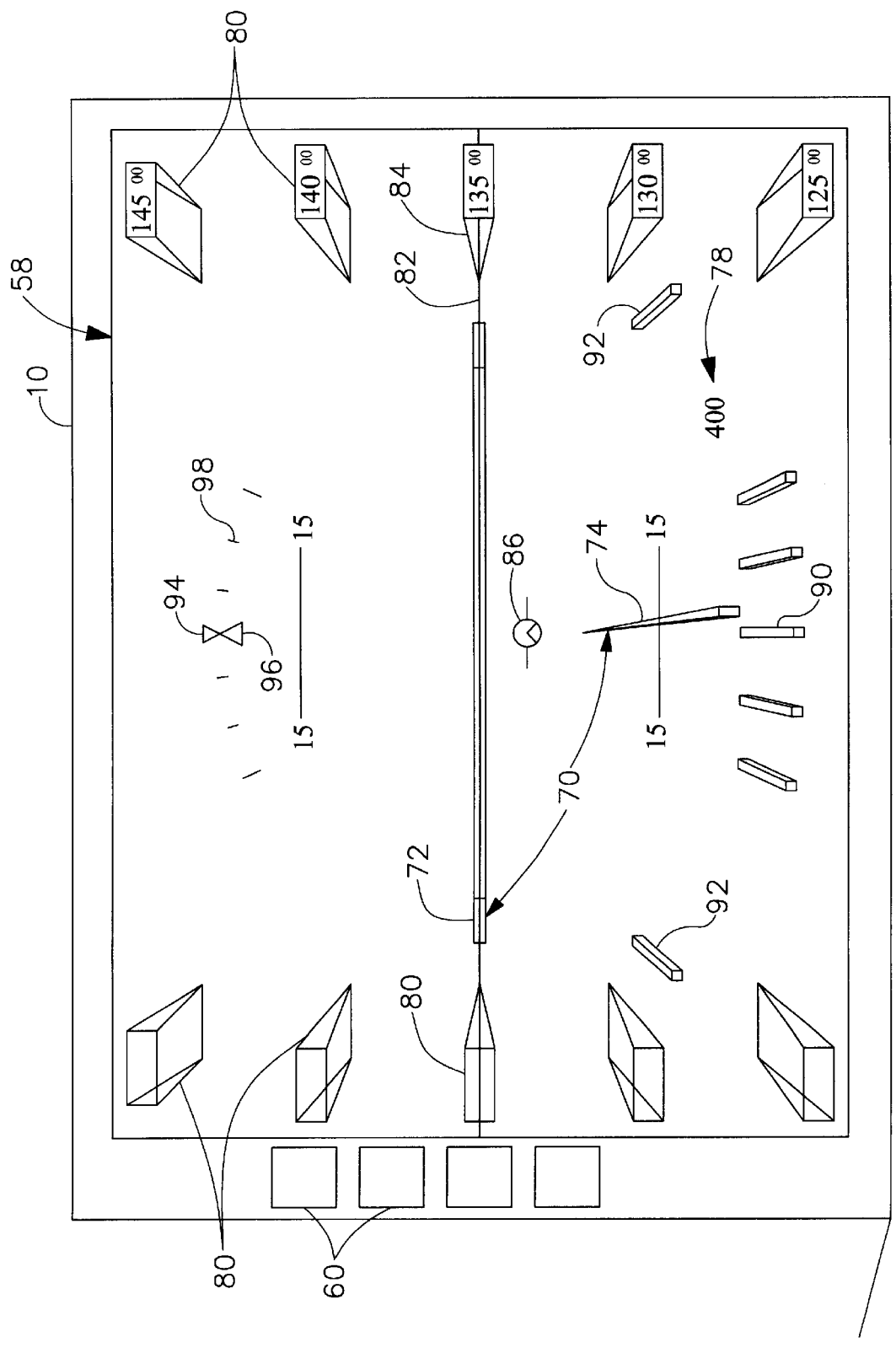
FIG. 3 is a view of the PFD display screen having 3D flight path error symbology illustrating an aircraft positioned along a glideslope and along a preferred groundtrack.

Referring now to FIG. 3, there is shown a 3D visual display generated by display screen 58 of primary flight display 10 according to the preferred embodiment of the present invention. PFD 10 is seen to have the display screen 58, and a plurality of control buttons 60 allowing the pilot to select and control of the various displays and information being displayed. The various symbology displayed on screen 58 of display 10 will now be described in considerable detail.

Figure 7:
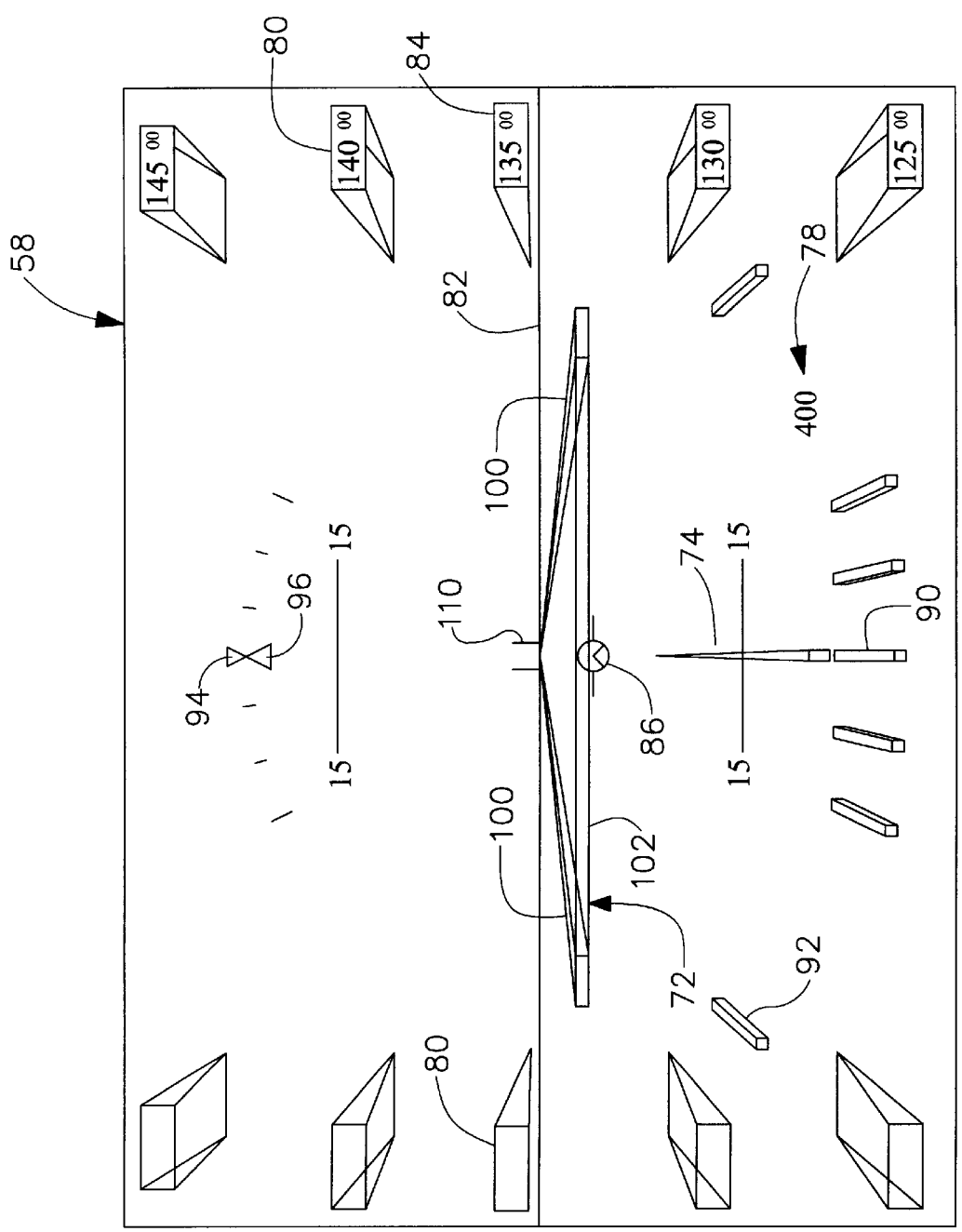
FIG. 7 is a view of the PFD display screen when the aircraft is slightly above a desired glideslope and is proximate the runway such that the 3D vertical path error symbology and lateral flight path error symbology taper towards and intersect the end of the displayed runway.

First, as generally shown at 70, 3D flight path error symbology is displayed. 3D path error symbology 70 is seen to be composed of two components, a 3D vertical path error 72 and a 3D horizontal flight path error display 74. Each of these 3D flight error symbols taper to and originate at a vanishing point. This vanishing point is indicative of ground reference navigation sources, such as a glideslope beacon for the glideslope and a localizer for the groundtrack, each located at and originating from the approach end of a runway, such as illustrated in FIG. 7. In this Figure, the runway is not shown as the aircraft is far from the airport. The vertical path error symbol 72 and the horizontal flight path vector 74 will be discussed in further detail shortly in view of the subsequent Figures. Aircraft velocity is indicated at 78.

Still referring to FIG. 3, display screen 58 is seen to also display a plurality of evenly spaced 3D altitude symbols 80 having respective altitude symbology displayed therein. Altitude symbols 80 are seen to comprise triangular wedge-shaped symbology tapering toward the specified altitude at an infinite distance in front of the aircraft. The altitude symbols may be tilted with the pitch of the aircraft to represent climbing or descending. The altitude symbols 80 intuitively allow the pilot to ascertain and appreciate the present altitude and altitude change rate of the aircraft with respect to the desired altitude.

An attitude sphere 86 is also displayed which instantaneously indicates the direction the nose of the aircraft is pointed to help the pilot steer the aircraft to and along the proper glideslope. A plurality of evenly spaced 3D lateral symbols 90 are displayed along the bottom of the display, each symbol 90 tapering towards the navigational ground reference such as the ground based localizer. When the aircraft is flying along the desired groundtrack toward the runway, the 3D lateral flight path vector 74 will align with the center symbol 90, as shown in FIG. 3. If the aircraft is positioned to the left or to the right of the proper groundtrack, the 3D lateral flight error indicator 74 will shift according, as will be shown shortly in the following Figures. Symbols 92 are provided to indicate known points of deviation from the target glideslope, typically called dots.

At the top of the display 58 is seen a triangular vertical reference symbol 94 and a triangular roll symbol 96 referenced to the vertical symbol 94 to indicate the roll of the aircraft with respect to a true vertical orientation. A plurality of evenly spaced tick symbols 98 are also displayed. The roll symbol 96 rotates along the ticks 98 to indicate the relative roll of the aircraft with respect to the vertical. Each tick may, for instance, represent 2degrees. For instance, if the aircraft is rolling to the right 6 degrees, the roll indicator 96 will point to the third tick 98 clockwise from the vertical symbol 94.

Figure 4:
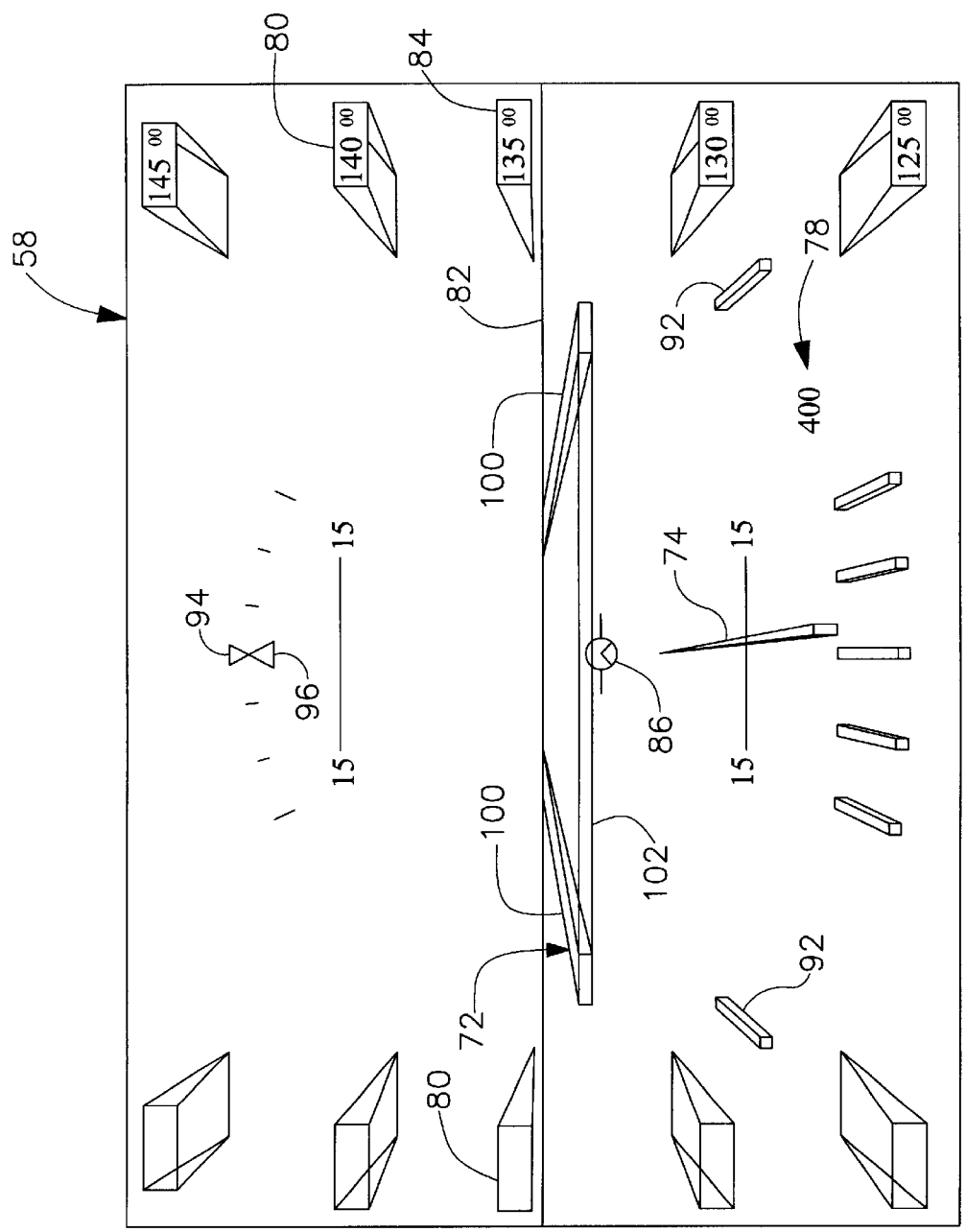
FIG. 4 is an illustration of the PFD display screen when the aircraft is positioned far from the runway and slightly above the glideslope as represented by the vertical path error symbology and the altitude symbology.

Turning now to FIG. 4, there is illustrated the 3D flight path error symbology 70 when the aircraft is positioned slightly above a proper glideslope, at a large distance from a runway, and along a proper groundtrack. The 3D vertical path error 72 is seen to have a pair of opposing triangular wedge symbols shown at 100 each, each symbol 100 tapering toward the respective distant ground based navigation reference, such as the runway glideslope beacon (not shown). A pair of parallel horizontal lines 102 are seen to extend between the ends of the vertical path error symbol wedges 100. As shown in FIG. 4, when the horizontal line symbols 102 are positioned below the horizon symbol 82, the aircraft is positioned above the proper glideslope. To lower the aircraft onto the proper glideslope, the pilot may lower the aircraft onto the proper glideslope by lowering the pitch of the aircraft, as indicated by lowering the position of the attitude sphere 86 shown in FIG. 4, and reducing speed.

Figure 5:
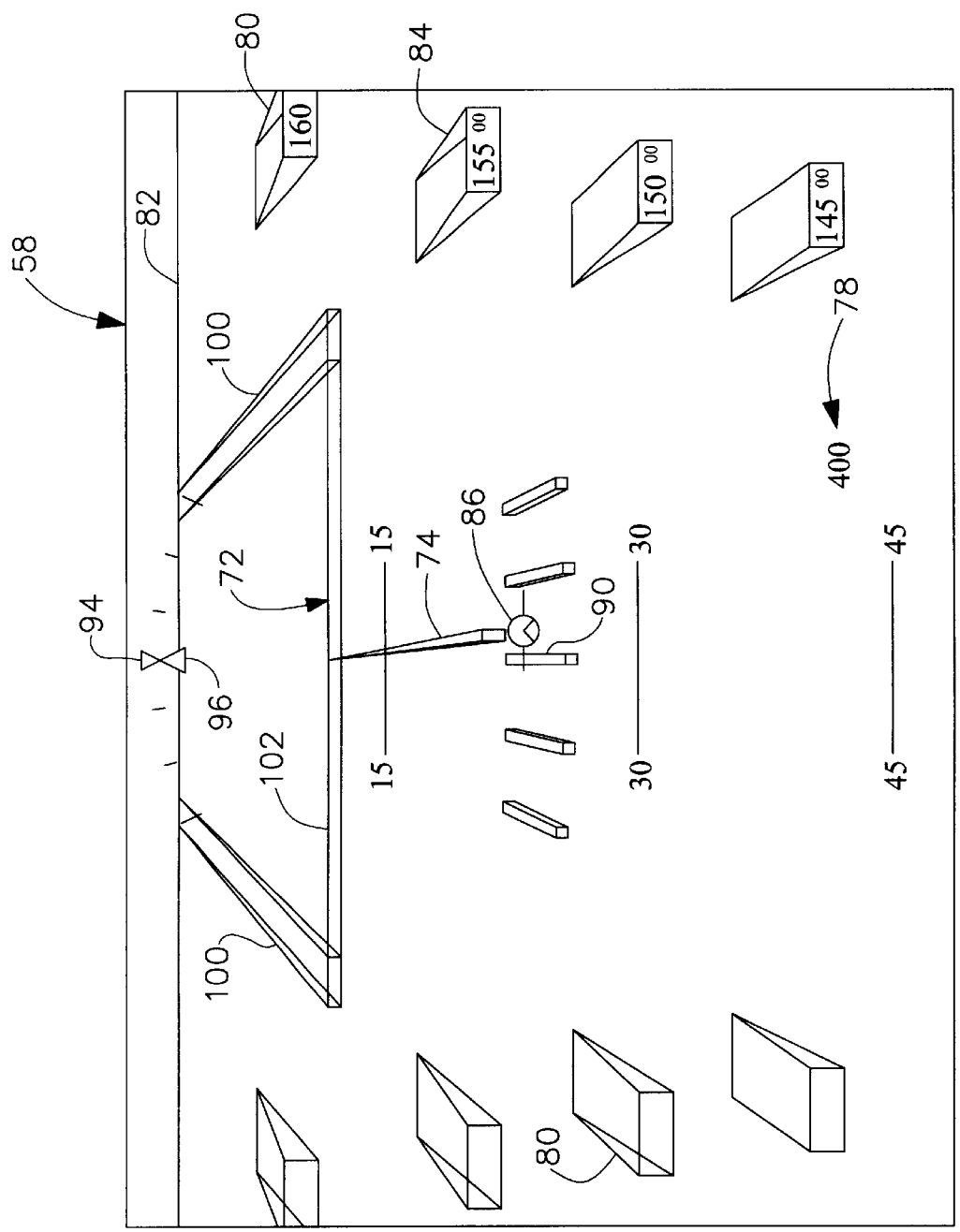
FIG. 5 is a view of the PFD display screen when the aircraft is substantially above the glideslope.

Referring now to FIG. 5, there is illustrated the display 58 depicting the screen when the aircraft is substantially above the proper glideslope. As illustrated, the opposing lateral flight path error symbols 100 become more parallel to one another, yet still taper toward the land base navigation device such as the glideslope beacon. As illustrated, the upper surface of each symbol 100 becomes more viewable, illustrating the plane defined by the glideslope being more visible to the pilot since the aircraft is above the glideslope plane. The interconnecting lateral symbols 102 are seen to be positioned even further below the horizon symbol 82 to indicate that the aircraft is positioned substantially above the glideslope. To bring the aircraft back to the proper glideslope, the pilot may further lower the pitch of the aircraft, such as by lowering the attitude sphere 86 substantially below the horizon symbol 82, as shown, and reducing speed. As depicted in FIG. 5, all of the altitude symbols 80 are tapering upwardly toward the horizon symbol 82. In addition, the top elongated surface of the lateral flight error symbol 74 becomes more visible as the aircraft is positioned over the glideslope. As shown in FIG. 5, the aircraft is properly aligned along the groundtrack whereby the lateral flight vector symbol 74 is aligned with the center tick of symbols 90. The aircraft is level as indicated by the roll symbol 96 aligning with the vertical symbol 94. Also displayed in 15 degree increments are laterally extending symbols indicating what angle the aircraft is above the desired glideslope. These symbols are provided in 15 degree increments indicated at 15, 30 and 45 in FIG. 5. The lateral symbology 102 is slightly above the 15 degree indication, whereby the laterally extending symbol 102 relative to the laterally extending symbols indicates that the aircraft is about 13 degrees above the glideslope in FIG. 5. The position of the symbology 102 with reference to these 15 degree indications further provides an indication to the pilot as to just how far above, or how far below, the aircraft is with respect to the proper glideslope.

The 3D symbology, alone and in combination, allows the pilot to intuitively ascertain the situational position and attitude of the aircraft with respect to the proper glideslope and groundtrack. The vertical flight position vector 100, the lateral extending symbology 102, the 15 degree markings, and the position of the lateral flight position vector 74 all together provide a 3D display to indicate the relative position of the aircraft. Again, the symbols 100 and symbols 102 together define a glideslope plane and are collectively represented by the vertical path error symbol 72.

Figure 6:
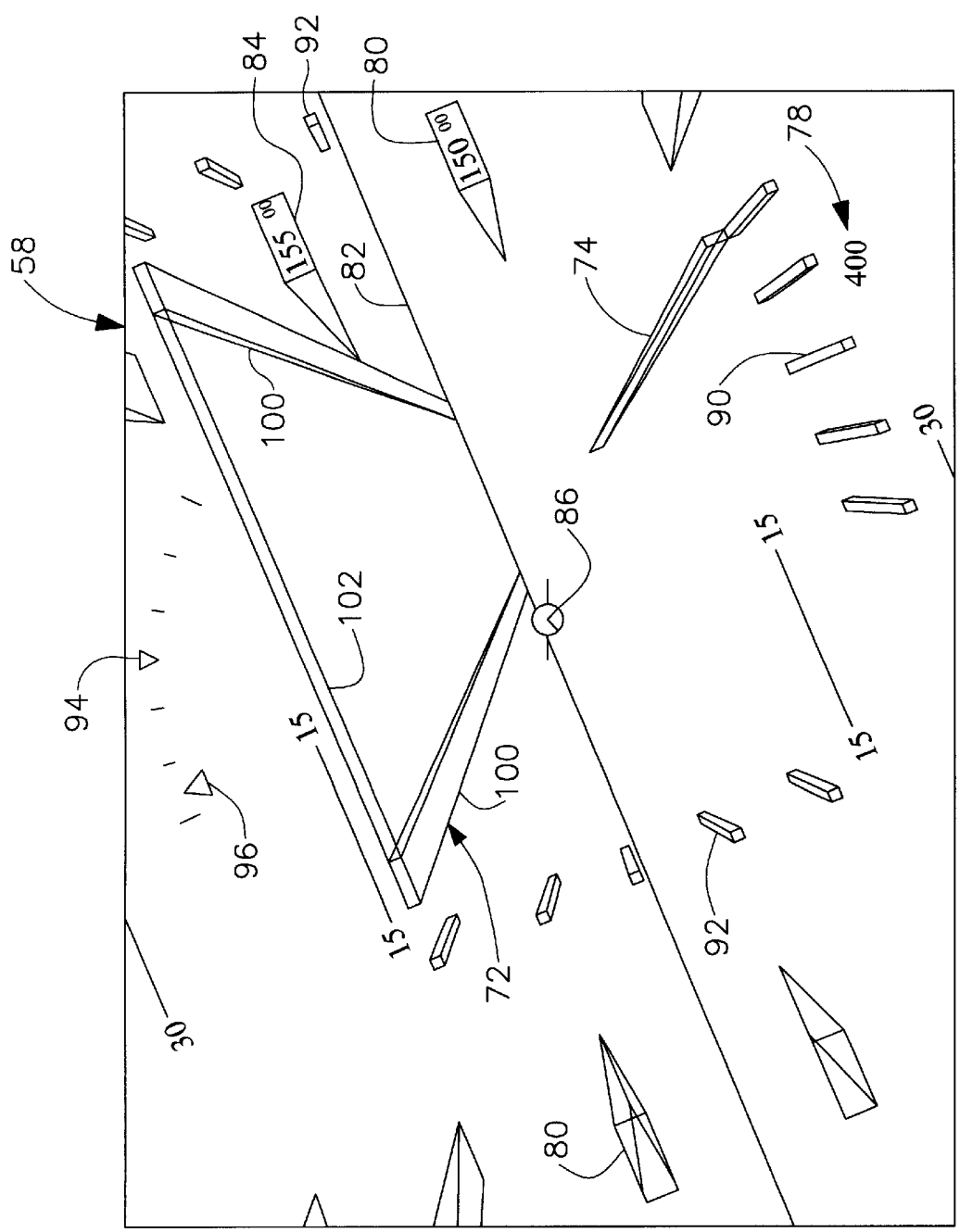
FIG. 6 is an illustration of the PFD display screen when the aircraft is below the desired glideslope and turning to the right back towards a desired groundtrack.

Turning now to FIG. 6, there is illustrated the display 58 where the symbology together indicates, in 3-dimensions, that the aircraft is both below the desired glideslope, and also to the left of the desired groundtrack. As illustrated, the bottom of the glideslope plane depicted by the 3D vertical path error 72 is viewable. The lateral extending symbology 102 is above the horizon symbol 82 and proximate the 15 degree marking to illustrate the aircraft is about 15 degrees below the glideslope, with reference to the ground navigation source such as the glideslope beacon. The lateral flight path vector 74 is two ticks to the right of the center symbology 90, indicating that the aircraft is about 10 degrees to the left of the desired groundtrack, where each tick represents approximately 5 degrees increments from the groundtrack. Since the aircraft is to the left of the desired groundtrack in FIG. 6, the left side of the triangular lateral flight vector display 74 is viewable. Also, the altitude symbols 80 are seen to all taper toward the horizon symbol 82, which is seen to be angled from the lower left portion of the screen to the upper right portion of the screen to indicate that the aircraft is rolled to the right. To compensate, the aircraft is rolled to the left, as indicated by the roll symbol 96 being positioned about 2.5 ticks to the left of the vertical reference symbology 94. To help navigate the aircraft back up towards the glideslope defined by the vertical path error symbol 72, the nose of the aircraft may be pointed upwardly as indicated by the attitude sphere 86 and applying sufficient power to achieve sufficient aircraft velocity. The symbols 92 also indicate to just what degree the aircraft is above or below the glideslope. In FIG. 6, each tick indicated by symbol 92 represents about 7.5 degrees. Thus, as shown in FIG. 6, the left symbol 100 extends proximate the second tick above the center tick indicating a horizontal flight, and thus, the aircraft is indicated as being 15 degrees below the desired glideslope.

Referring now to FIG. 7, there is shown the aircraft being positioned slightly above the glideslope plane, and being positioned proximate the runway indicated at symbol 110. The runway symbol 110 is indicated as a rectangle, whereby the ground navigation sources, such as the glideslope beacon and localizer, are seen to be referenced at the approaching end of the runway. Each of the vertical path error symbology 100 are seen to taper to, and terminate at, the end of the runway 110 at the navigation source i.e. the glideslope beacon. Thus, as the aircraft becomes closer to the runway, the left and right symbol 100 will converge to each other and intersect with one another at the runway symbol 110. FIG. 7 illustrates that the aircraft is positioned along the proper groundtrack as indicated by the lateral flight position vector 74 being aligned over the center symbol 90 and tapering towards a localizer at the end of the runway. The attitude sphere 86 is positioned slightly below the horizon 82 to indicate that the aircraft nose is pointed downward slightly to direct the aircraft onto the proper glideslope. The aircraft is level, as indicated by the roll symbol 96 being aligned with the vertical symbol 94. The altitude of the aircraft is indicated by the numbers displayed in the altitude symbols 80. As illustrated, each symbol 80 represents a deviation of altitude of about 500 feet.

According to the present invention, as illustrated in the various Figures, the pilot has improved situational awareness and is able to directly observe the flight path angle and make adjustments accordingly. The pilot is able to continuously adjust the aircraft pitch/attitude and velocity to maintain altitude, glideslope, or some other flight path as the pilot is also aware of the velocity vector of the aircraft. Lateral corrections of the aircraft can also be compensated for winddrift since the lateral position of the flight path error symbol is illustrated. The pilot can find the right crab angle to compensate for crosswinds as this is done automatically when the pilot is controlling the groundtrack, as illustrated by the lateral flight position vector 74, instead of controlling the heading of the aircraft. Both the vertical path error symbol 72 and the lateral flight path vector 74 are three dimensional symbols tapering toward a vanishing point located on the horizon line at a selected course or desired track angle. Both flight path vector symbols 72 and 74 indicate both the height of the aircraft above the selected course, and the desired groundtrack as indicated by the amount of the side and top surface of the respective symbol that is visible.

For instance, as shown in FIG. 5, a larger portion of the top surface of the 3D symbols 100 and 74 are viewable when the aircraft is further above the selected course and desired track angle. When the aircraft is to the left or the right of a desired course or track angle, the respective side surface of the various 3D symbols becomes more visible, as illustrated in FIG. 6. As shown in FIG. 6, the left side of the lateral flight position vector 74 is viewable as is the left side of right symbol 100, and whereby the right surface of the left symbol 100 is viewable. In addition, the vanishing point of the symbols 100 is skewed to the right of the horizon 82 and to the right of the vanishing point of lateral flight path vector 74 to indicate that the aircraft is to the left of the selected course or desired track angle. Collectively, the 3D vertical path error 72 and the 3D lateral flight vector 74 intuitively allow the pilot to ascertain whether the aircraft is above or below a desired glideslope, and whether or not the aircraft is to the left or the right the selected course or desired track angle. Thus, each of these symbols is not exclusively used to ascertain one orientation. Rather, the 3-dimensional feature of each symbol 72 and 74 allows multiple information to be ascertained as described.

For instrumentation landing system (ILS) and manual landing system (MLS) approaches, the lateral deviation symbol 74 is displayed in a manner indicating the height of the aircraft above the ground. Since groundtrack angle can be significantly different from heading due to a strong crosswind, i.e. a large drift angle, the heading scale is centered on the groundtrack instead of heading. By centering the heading scale on track, the flight position error symbols 72 and 74 will remain in the center of the display, and the course line/runway symbology will move with respect to the flight position error symbols 72 and 74.

In summary, the improved primary flight display 10 provides significant improvements to pilots, improving the ability to control the aircraft and improved situational awareness. The 3D symbology displayed by display 10 represents a fundamental change in the pilot's aircraft control paradigm which significantly and measurable reduces workload. With the display 10 of the present invention, the pilot gets better aircraft control with less effort, two seemingly diametrically opposed features. Display 10 of the present invention achieves technical advantages and accomplishes this feat by combining traditional cockpit performance indications i.e. airspeed, altitude, vertical speed, etc. and traditional control indications including attitude and power, into the new integrated symbology elements of the flight path vector group represented by vertical path error symbol 72 and lateral flight path error symbol 74 that the pilot can directly control. Collectively, the 3D symbols provide a 3D image including the flight path vector symbols that enhances the awareness of the pilot to control the aircraft to accurately and to more easily monitor the performance of the automatic flight control system.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. An aviation display for an aircraft, comprising:
   means for receiving at least one input signal indicative of the aircraft situation and responsively providing situation signals; and
   display means receiving said situation signals and generating a three dimensional (3D) visual display including 3D symbology indicative of the aircraft situation;
   said 3D symbology including a 3D flight path error symbology indicative of a vertical flight path error and including a pair of opposing triangular symbols interconnected by symbology indicative of a roll of the aircraft.

2. The display as specified in claim 1 wherein said 3D visual display includes symbology indicative of a ground reference navigation source, wherein said 3D flight path error symbol is referenced to said ground reference navigation source symbology.

3. The display as specified in claim 1 wherein said 3D flight path error symbology includes lateral flight path error symbology indicative of a lateral flight path error of the aircraft.

4. The display as specified in claim 1 wherein said 3D vertical path error symbology tapers towards symbology indicative of a ground reference navigation source.

5. The display as specified in claim 1 wherein said pair of opposing triangular symbols are interconnected by symbology indicative of a pitch of the aircraft.

6. The display as specified in claim 1 wherein said 3D lateral flight path error symbology includes a triangular symbol.

7. The display as specified in claim 6 wherein said triangular symbol is elongated.

8. The display as specified in claim 6 wherein said triangular symbol tapers toward symbology indicative of a ground reference navigation source.

9. The display as specified in claim 1 wherein said 3D visual display further generates symbology indicative of an attitude of the aircraft.

10. The display as specified in claim 9 wherein said attitude symbology comprises an attitude sphere.

11. The display as specified in claim 1 wherein said 3D visual display further includes 3D altitude symbology indicative of the aircraft altitude relative to a desired altitude.

12. The display as specified in claim 11 wherein said 3D altitude symbology comprises triangular symbols tapering towards points at the represented altitude at an infinite distance in front of the aircraft.

13. The display as specified in claim 1 wherein said 3D visual display generates symbology indicative of a roll of the aircraft.

14. An aviation display visually rendering aircraft situation information coupled thereto, wherein said aircraft situation information is rendered in three dimension (3D), said aircraft situation information including a 3D flight path vector symbology, said 3D symbology including a 3D flight path error symbology indicative of a vertical flight path error and including a pair of opposing triangular symbols interconnected by symbology indicative of a roll of the aircraft.

15. The display as specified in claim 14, wherein said 3D flight path error symbology includes a lateral flight path error symbology.

16. The display as specified in claim 15 wherein said lateral flight path error symbology is referenced to a ground navigation source symbology.

17. The display as specified in claim 14 wherein said vertical path error symbology is referenced to a ground navigation source symbology.

18. The display as specified in claim 17 wherein said vertical path error symbology tapers toward the ground navigation source symbology.

19. The display as specified in claim 14 wherein said lateral flight path error symbology is referenced to a ground navigation source symbology.

20. The display as specified in claim 19 wherein said vertical path error symbology tapers toward the ground navigation source symbology.

* * * * *